W. A. PAGE & A. R. PRITCHARD.
HANDLE.
APPLICATION FILED JULY 13, 1910.
1,010,680.
Patented Dec. 5, 1911.
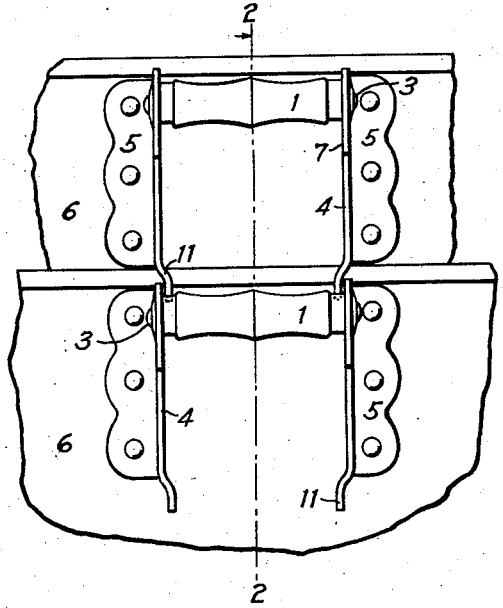
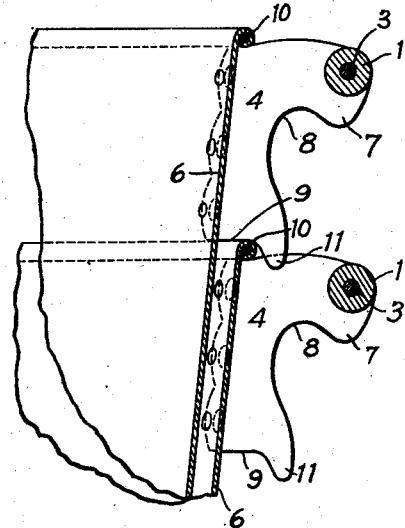
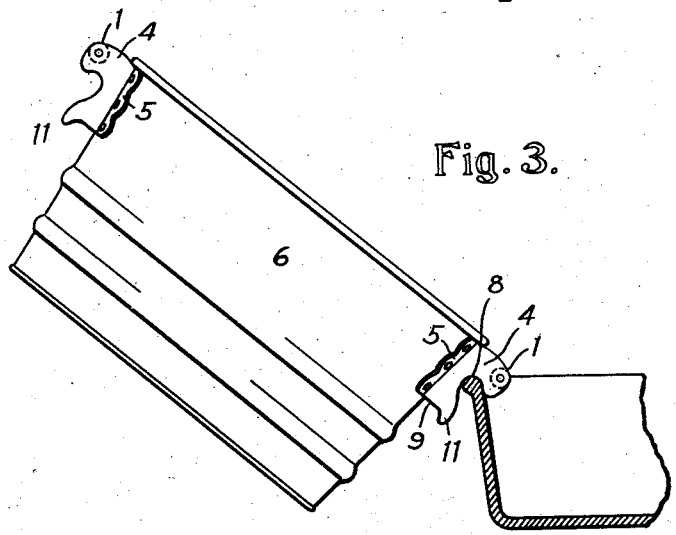
Witnesses:
C. W. Carroll
L. Thon
Inventors:
William A. Page and
Albert R. Pritchard
by their attorneys
Osgood, Davis & Worsey

UNITED STATES PATENT OFFICE.

WILLIAM A. PAGE, OF CANANDAIGUA, AND ALBERT R. PRITCHARD, OF ROCHESTER, NEW YORK; SAID PAGE ASSIGNOR TO THE LISK MANUFACTURING COMPANY, LTD., OF CANANDAIGUA, NEW YORK, A CORPORATION.

HANDLE.

1,010,680.   Specification of Letters Patent.   Patented Dec. 5, 1911.

Application filed July 13, 1910. Serial No. 571,861.

To all whom it may concern:

Be it known that we, WILLIAM A. PAGE and ALBERT R. PRITCHARD, citizens of the United States, and residents, respectively, of Canandaigua, Ontario county, State of New York, and the city of Rochester, Monroe county, State of New York, have invented certain new and useful Improvements in Handles, of which the following is a specification.

The present invention relates to handles for wash-tubs or other large vessels, particularly such as are made of sheet-metal.

Vessels of the kind above referred to are commonly made of a somewhat tapering or conical form, so that two or more of the same size may be nested one within another, either for convenience in shipping or for compact storage when not in use. Owing to the tapering form of the body, however, the vessels when so nested tend to become wedged tightly together, so as to be separated with difficulty. Ordinarily, therefore, it is necessary to interpose packing material of some kind to prevent one vessel from entering another sufficiently to become so wedged.

One object of the present invention is to provide vessels of the kind in question with handles so formed, that, in addition to performing the ordinary function of handles, they provide abutments by which wedging together of the vessels is prevented. These abutments are adapted to rest upon the upper edge of the body of the lower of two nested vessels, and thus to support the upper vessel without the necessity of engagement between the walls or bottoms of the vessels. In the preferred embodiment these abutments are also provided with depending lugs or hooked portions, which operate to maintain the parts horizontally in the proper relative position, and to prevent the abutments from being forced downward into the body of the vessel below, either through lateral displacement of the upper vessel or through spreading of the upper edge of the lower vessel.

Another object of the invention is to produce a handle for wash-tubs and similar vessels having convenient provision for resting the body of the vessel upon the edge of a sink, or other vessel, into which it is desired to pour the contents of the tub.

To this end our improved handle is so formed as to provide a hooked portion beneath the grip-portion of the handle, this hooked portion being produced by widening the ends of the brackets of the handle in such a manner that when the handle is resting with its hooked portion upon the edge of a sink or another vessel the grip-portion may still be held in the hand of the user.

In the accompanying drawings:—Figure 1 is a front elevation of two wash-tub handles embodying the present invention, together with the portions of the bodies of the tubs to which they are attached, showing the handles in the position occupied by them when the two tubs are nested; Fig. 2 is a section on the line 2—2 in Fig. 1, looking from left to right in the latter figure; and Fig. 3 is a side elevation of a complete wash-tub provided with the handles of Figs. 1 and 2, illustrating the operation of the handle when the contents of the tub is poured into a sink.

In the illustrated embodiment of the invention the grip-portion 1 of the handle comprises, as is usual in such devices, a round horizontal member supported near the upper edge of the tub, and at a sufficient distance therefrom to permit it to be conveniently grasped by the hand. The grip is mounted upon a rod 3 which is supported at its ends in two brackets 4, projecting from the body of the tub. The brackets are formed of heavy sheet-metal and are provided with flanges 5, which are riveted in the usual manner to the body 6 of the tub. Each bracket is widened at its upper end so as to produce a lug 7 depending below the grip. By this hooked formation a recess 8 is produced which is adapted to serve conviently as an abutment to rest upon the upper edge of a sink, or other vessel, into which it is desired to pour the contents of the tub. This operation is illustrated in Fig. 3. Owing to the production of the recess 8 by widening the bracket below the grip, as above described, the location of the grip is such as to afford substantial clearance between the grip and the sink when the handle is used in the manner just described, so that in placing the handle upon the edge of the sink the hand of the user does not come into contact with the sink and need not be removed from the grip until after the edge of the sink has been so engaged. This is a feature of practical value, as it renders the use of the device more convenient, while preventing accidental injury to the hand of the user. This is particularly important where the contents of the tub is so heavy that the handle cannot conveniently be released until securely engaged upon the edge of the sink.

The abutment by which the handle is adapted to support one tub upon the edge of another is produced at the lower extremity 9 of the bracket 4, as shown particularly in Fig. 2. The width of the bracket and the location of this abutment 9 are such as to permit the bodies of the tubs to be nested to the required extent, while a sufficient space is preserved between them to prevent wedging, and also to facilitate the drying of the tubs, when they are nested after having been used. At the outer extremity of the horizontal abutment 9 the bracket is provided with a depending lug or hooked portion 11, which is located outside of the beaded upper edge 10 of the lower tub. The lugs 11 prevent lateral movement of the upper tub, and also prevent spreading of the edge of the lower tub, and thus is prevented the accidental forcing of the bracket into the body of the lower tub, such as otherwise might occur if the tubs were roughly handled. The lugs on each handle also extend downward so far as to overlap the brackets of the handle of the tub below, and accordingly they are laterally offset, as shown in Fig. 2, so as to enter between said brackets. By this arrangement the handles are retained in position one directly above another, so that the weight of the several tubs is transmitted directly from one handle to another.

The arrangement just described is particularly useful in packing tubs for shipment. Any convenient number of tubs may be nested together, since the weight of the whole is borne solely by the handles, none of the bodies of the tubs being required to support anything but its own weight. This arrangement also obviates the necessity of any packing material between the tubs, and after the tubs have been nested or stacked with the handles in alinement, as in Fig. 1, it is necessary only to pass sticks vertically through the several handles and connect the sticks at the top and bottom of the stack, in order to maintain the tubs in their nested position. By the use of the two abutments above described the handle serves the triple function of a handle proper, a device for facilitating the pouring of the contents of the tub, and a means for properly separating the tubs when nested, and the handle is modified to adapt it to perform these several functions without substantial increase in the cost of manufacture.

We claim:—

1. In combination with the body of a wash-tub, handles secured to opposite sides of said body near its upper edge, each handle having substantially horizontal portions 9 at its lower ends, adapted to support the tub upon the upper edge of a second tub when the tubs are nested, also having lugs 11 adjacent to and depending below said horizontal portions, respectively, adapted to prevent both lateral displacement of the upper tub and spreading of the lower tub when nested, also having widened portions above said horizontal portions, respectively, that are recessed at 8 and formed into lugs 7, and also having a grip 3 secured between said widened portions above said lugs 7; substantially as shown and described.

2. In combination with the body of a wash-tub, handles secured to opposite sides of said body near its upper edge, each handle consisting of a pair of brackets 4 having substantially horizontal portions 9 at their lower ends, adapted to support the tub upon the upper edge of a second tub when the tubs are nested, and each bracket having a lug 11 adjacent to said horizontal portions, respectively, said lugs being extended downward and laterally offset so as to enter between the brackets of the handle of the tub below when the tubs are nested together; substantially as shown and described.

WILLIAM A. PAGE.
ALBERT R. PRITCHARD.

Witnesses:
E. BAGLEY,
CHAS. M. STEEL.

---

Copies of this patent may be obtained for five cents each, by addressing the "Commissioner of Patents, Washington, D. C."